United States Patent
Shin et al.

(10) Patent No.: US 11,435,459 B2
(45) Date of Patent: Sep. 6, 2022

(54) METHODS AND SYSTEMS FOR FILTERING ULTRASOUND IMAGE CLUTTER

(71) Applicant: KONINKLIJKE PHILIPS N.V., Eindhoven (NL)

(72) Inventors: Jun Soeb Shin, Medford, MA (US); Seungsoo Kim, Andover, MA (US); Francois Guy Gerard Marie Vignon, Andover, MA (US); Sheng-Wen Huang, Ossining, NY (US); Jean-Luc Francois-Marie Robert, Cambridge, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 354 days.

(21) Appl. No.: 16/493,149

(22) PCT Filed: Mar. 13, 2018

(86) PCT No.: PCT/EP2018/056307
§ 371 (c)(1),
(2) Date: Sep. 11, 2019

(87) PCT Pub. No.: WO2018/167101
PCT Pub. Date: Sep. 20, 2018

(65) Prior Publication Data
US 2020/0081107 A1    Mar. 12, 2020

Related U.S. Application Data

(60) Provisional application No. 62/470,375, filed on Mar. 13, 2017.

(30) Foreign Application Priority Data

Mar. 27, 2017 (EP) .................................... 17163120

(51) Int. Cl.
| | | |
|---|---|---|
| *G03B 42/06* | (2021.01) | |
| *G01S 7/52* | (2006.01) | |
| *G01S 15/89* | (2006.01) | |

(52) U.S. Cl.
CPC ...... *G01S 7/52047* (2013.01); *G01S 15/8915* (2013.01)

(58) Field of Classification Search
None
See application file for complete search history.

(56) References Cited

U.S. PATENT DOCUMENTS 5,997,479 A   12/1999   Savord et al.
6,013,032 A    1/2000   Savord
(Continued)

FOREIGN PATENT DOCUMENTS

| CA | 2570913 A1 | * | 1/2006 | ............... G06T 7/38 |
| CH | 618262 A5 | * | 7/1980 | ............. G02B 7/305 |

(Continued)

OTHER PUBLICATIONS

Reeg et al: "Improving Lateral Resolution in Ultrasonic Imaging by Utilizing Nulls in the Beam Pattern"; 2015 IEEE International Ultrasonics Symposium Proceedings, pp. 1-4.
(Continued)

*Primary Examiner* — Isam A Alsomiri
*Assistant Examiner* — Jonathan D Armstrong

(57) ABSTRACT

The invention provides a method for generating a filtered ultrasound image. The method begins by obtaining channel data. First and second apodization functions are applied to the channel data to generate first (610) and second (620) image data, respectively. A minimization function is then applied to the first (610) and second (620) image data, which may then be used to generate third (630) image data. The
(Continued)

filtered ultrasound image may then be generated based on the first (610) and third (630) image data.

13 Claims, 5 Drawing Sheets

(56) References Cited

U.S. PATENT DOCUMENTS

| | | | |
|---|---|---|---|
| 6,283,919 B1 | 9/2001 | Roundhill et al. | |
| 6,432,055 B1 * | 8/2002 | Carp | A61B 8/481 |
| | | | 600/437 |
| 6,436,044 B1 | 8/2002 | Wang | |
| 6,443,896 B1 | 9/2002 | Detmer | |
| 6,458,083 B1 | 10/2002 | Jago et al. | |
| 6,530,885 B1 | 3/2003 | Entrekin et al. | |
| 6,623,432 B2 | 9/2003 | Powers et al. | |
| 6,658,141 B1 * | 12/2003 | Jeong | G01S 7/52046 |
| | | | 382/128 |
| 7,215,811 B2 * | 5/2007 | Moselhi | G01N 21/954 |
| | | | 382/149 |
| 10,281,568 B2 * | 5/2019 | Oelze | G01S 7/52047 |
| 2009/0141957 A1 | 6/2009 | Yen et al. | |
| 2014/0146155 A1 * | 5/2014 | Gibby | G06T 7/0016 |
| | | | 348/77 |
| 2016/0354062 A1 | 12/2016 | Hwang | |
| 2017/0108584 A1 * | 4/2017 | Oelze | G01S 7/52047 |
| 2018/0249981 A1 * | 9/2018 | Johnson | A61B 6/4441 |

FOREIGN PATENT DOCUMENTS

| | | | | |
|---|---|---|---|---|
| DE | 3908648 A1 * | 9/1990 | | G01S 15/8993 |
| DE | 69832357 T2 * | 8/2006 | | G06T 5/20 |
| EP | 0526968 A2 * | 2/1993 | | G06F 17/175 |
| EP | 2518527 A1 | 10/2012 | | |
| JP | 2004337461 A * | 12/2004 | | |
| WO | WO-9215955 A1 * | 9/1992 | | A61B 5/7214 |
| WO | 2016060335 A1 | 4/2016 | | |
| WO | WO-2017075509 A1 * | 5/2017 | | A61B 5/0507 |
| WO | WO-2018197460 A1 * | 11/2018 | | G01S 7/52077 |

OTHER PUBLICATIONS

Reeg: "Null Subtraction Imaging Technique for Biomedical Ultrasound Imaging"; Thesis for Graduate College of the University of Illinois, 2016, 47 Page Document.

Savoia et al:"Improved Lateral Resolution and Contrast in Ultrasound Imaging Using a Sidelobe Masking Technique"; 2014 IEEE International Ultrasonics Symposium Proceedings, pp. 1682-1685.

Seo et al: "Sidelobe Suppression in Ultrasound Imaging Using Dual Apodization With Cross-Correlation"; IEEE Transactions on Ultrasonics, Ferroelctrics, and Frequency Control, vol. 55, No. 10, Oct. 2008, pp. 2198-2210.

Stankwitz et al: "Nonlinear Apodization for Sidelobe Control in SAR Imagery"; IEEE Transactions on Aerospace and Electronic Systems, vol. 31, No. 1, Jan. 1995, pp. 267-279.

PCT/EP2018/055525 Written Opinion&ISR, dated Jun. 21, 2019, 12 Pages.

* cited by examiner

METHODS AND SYSTEMS FOR FILTERING ULTRASOUND IMAGE CLUTTER

CROSS-REFERENCE TO PRIOR APPLICATIONS

This application is the U.S. National Phase application under 35 U.S.C. § 371 of International Application No. PCT/EP2018/056307, filed on Mar. 13, 2018, which claims the benefit of U.S. Provisional Patent Application No. 62/470,375, filed on Mar. 13, 2017 and European Patent Application No. 17163120.3, filed on Mar. 27, 2017. These applications are hereby incorporated by reference herein.

FIELD OF THE INVENTION

This invention relates to the field of ultrasound image processing, and more specifically to the field of sidelobe clutter filtering.

BACKGROUND OF THE INVENTION

Ultrasound imaging is increasingly being employed in a variety of different applications. It is important that the image produced by the ultrasound system is as clear and accurate as possible so as to give the user a realistic interpretation of the subject being scanned. This is especially the case when the subject in question is a patient undergoing a medical ultrasound scan. In this situation, the ability of a doctor to make an accurate diagnosis is dependent on the quality of the image produced by the ultrasound system.

Spatial and contrast resolutions are two of the most important aspects of ultrasound image quality; however, they are often suboptimal in ultrasound imaging. Numerous beamforming techniques have been proposed in the past in an attempt to improve image quality.

One example is adaptive beamforming techniques, such as minimum variance (MV) beamforming which adaptively computes complex apodization values from the received channel data. A drawback of MV beamforming is that it is computationally intensive as an inversion of the spatial covariance matrix needs to be performed for each pixel in the image. In addition, even though MV beamforming has shown some potential for improved spatial resolution, it is not optimized for rejecting off-axis and reverberation clutter signals to improve image contrast.

Another example is adaptive weighting techniques, which employ various weighting factors such as the coherence factor (CF) and the generalized coherence factor (GCF). Their computation is usually considerably less intensive than MV beamforming but they still require access to per-channel data and the computation of a weighting mask that is used to decrease the amount of the clutter contributions from the image. Furthermore, these methods are typically not designed to achieve an improvement in spatial resolution.

Document EP 2 518 527 discloses a beamformer for forming a reception beam using a multichannel signal reflected from a subject. The beamformer includes a signal generator that generates a plurality of signals by applying different apodization functions to the multichannel signal.

Document CHI SEO ET AL. discloses a method of dual apodization with cross-correlation. The method uses dual apodization or weighting strategies for removing or minimizing clutter.

SUMMARY OF THE INVENTION

The invention is defined by the claims.

According to examples in accordance with an aspect of the invention, there is provided a method for generating a filtered ultrasound image, the method comprising:
  obtaining channel data;
  generating first image data from the channel data using a first apodization function;
  generating second image data from the channel data using a second apodization function, wherein the second apodization function comprises a null filter;
  applying a minimizing function to the first and second image data;
  generating third image data based on the minimized first and second image data; and
  generating the filtered ultrasound image based on the first and third image data, wherein the generation of the filtered ultrasound image comprises:
    subtracting (291) the pixel values of the third image data from the pixel values of the first image data, thereby generating filtered pixels; and
    constructing the filtered ultrasound image using the filtered pixels.

This method performs filtering on an ultrasound image in order to reduce the amount of clutter in the final image. Received ultrasound signals typically comprise two prominent features: a mainlobe, which is the signal received from the target imaging location; and sidelobes, which are signals received from outside the target imaging location and so contribute to clutter in the final image. In addition to the conventional first image data, generated by way of a first apodization function, the method also includes generating second image data by way of a second apodization function, wherein the second apodization function comprises a null filter. An apodization function refers to a function that describes the weighting associated with individual channels of an ultrasound transducer array. The design of an apodization function is important as it determines the shape of the beampattern and, therefore, the point spread function of the ultrasound system. By generating two sets of image data using different apodization functions, it is possible to generate data sets highlighting different features of the channel data.

These two data sets are generated by applying the two apodization functions on the channel data received by an ultrasound system. By generating the data during the receiving stage, both data sets may be generated in a single transmit/receive cycle without compromising the frame rate. A minimizing function is then applied to the first and second image data sets, the result of which is used to generate a set of third image data. By applying a minimization function to the two data sets, it is possible to isolate the features highlighted by the apodization functions. For example, the sidelobes may be highlighted and isolated from the mainlobe in a set of image data. In this way, it may be possible to remove the sidelobes, thereby removing the clutter, without disturbing the mainlobe of the image data. The final filtered ultrasound image is then generated from the third and first image data. The generation of the filtered ultrasound image comprises: subtracting the pixel values of the third image data from the pixel values of the first image data, thereby generating filtered pixels; and constructing the filtered ultrasound image using the filtered pixels.

For example, the first image data may describe a standard ultrasound image that includes image clutter and the third image data may be adapted to highlight said clutter. By subtracting the highlighted clutter from the first image data, it is possible to remove the clutter from the first image data and generate a filtered ultrasound image.

In an embodiment, the minimization function comprises:
comparing the first and second image data; and
for each pair of pixels from the first and second image data, selecting a pixel with the minimum pixel value based on the comparison.

In this way, it is possible to apply a minimizing function to the first and second image data on a per pixel basis. For example, the signal intensity for each pixel may be stored in the image data. By comparing the signal intensity of a pixel from the first image data with a corresponding pixel of the second image data, it is possible to identify the lowest signal intensity for the pixel.

In a further embodiment, the generation of the third image comprises:
constructing the third image data using the selected pixels.

By constructing the third image data using the selected pixels, it is possible to generate a third image data set which comprises the minimum pixel values between the first and second images. In this way, the third image data may represent features highlighted by both the first and second apodization function.

In an arrangement, the method further comprises performing a log compression on the filtered ultrasound image.

The variation in the amplitude of radio frequency data collected by an ultrasound is very high. By performing log compression on the image, it is possible to generate a more balanced image.

In a further arrangement, the method, after the step of preforming a log compression of the ultrasound image, further comprises:
applying a spatial low pass filter to the first image data;
applying a spatial low pass filter to the filtered ultrasound image;
generating a detail component of the first image data by subtracting the spatial low pass filtered first image data from the first image data; and
combining the detail component of the first image data with the spatial low pass filtered version of the filtered image data.

In this way, it is possible to improve the spatial resolution of the filtered ultrasound image to match that of the first image, resulting in a clutter free, high contrast, high resolution ultrasound image.

In some arrangements, the first apodization function comprises a rectangular function.

For example, the first apodization function may be a conventional rectangular function for generating standard B-mode ultrasound image data, which will have a single high intensity signal at an arrival angle of 0 degrees, referred to as a mainlobe, and multiple signals of diminishing intensity spreading out from the mainlobe, referred to as sidelobes. The second apodization function may then be adapted to introduce a null at the mainlobe and a high intensity signal everywhere else. The arrival angle describes the angle between the received ultrasound signals and the transducer array. Signals arriving from off-axis scatterers will have a non-zero arrival angle.

By taking the minimum of the data sets generated by these functions, the image data will include all of the sidelobes and very little of the mainlobe. By subtracting these pixel values from the first image data, the sidelobes will be removed whilst maintaining the mainlobe of the image. In this way, sidelobe clutter filtering is achieved whilst maintaining the integrity of the target signal.

In an embodiment, a scaling factor of the second apodization function is variable.

By altering the scaling factor of the second apodization function, it is possible to control the width of the ultrasound transmission band and achieve an improvement in the spatial resolution of the final image.

In some designs, the method further comprises applying DAS beamforming to the first and second image data.

Delay and sum (DAS) beamforming is used to reduce the signal to noise ratio of signals received by a sensor, such as an ultrasonic transducer array.

In an arrangement, the method further comprises applying envelope detection to the first and second image data.

In this way, AC audio input may be transformed into a pulsed DC signal, to be used, for example, by an ultrasound system.

According to examples in accordance with an aspect of the invention, there is provided a computer program comprising computer program code means which is adapted, when said computer is run on a computer, to implement the method as described above.

According to examples in accordance with an aspect of the invention, there is provided an ultrasound system comprising:
an ultrasonic transducer array, wherein the ultrasonic transducer array is capable of emitting and receiving ultrasonic signals;
a signal processor for compiling the received ultrasonic signals into an ultrasound image;
a controller, wherein the controller is adapted to:
obtain channel data;
generate first image data from the channel data using a first apodization function;
generate second image data from the channel data using a second apodization function, wherein the second apodization function comprises a null filter;
apply a minimizing function to the first and second image data;
generate third image data based on the minimized first and second image data; and
generate the ultrasound image based on the first and third image data, wherein during the generation of the filtered ultrasound image the controller is further adapted to:
subtract the pixel values of the third image data from the pixel values of the first image data, thereby generating filtered pixels; and
construct the filtered ultrasound image using the filtered pixels.

In an embodiment, the ultrasound system further comprises:
a filter design processor, wherein the filter design processor is adapted to alter the second apodization function.

BRIEF DESCRIPTION OF THE DRAWINGS

Examples of the invention will now be described in detail with reference to the accompanying drawings, in which.

DETAILED DESCRIPTION OF THE EMBODIMENTS

Figure 1:
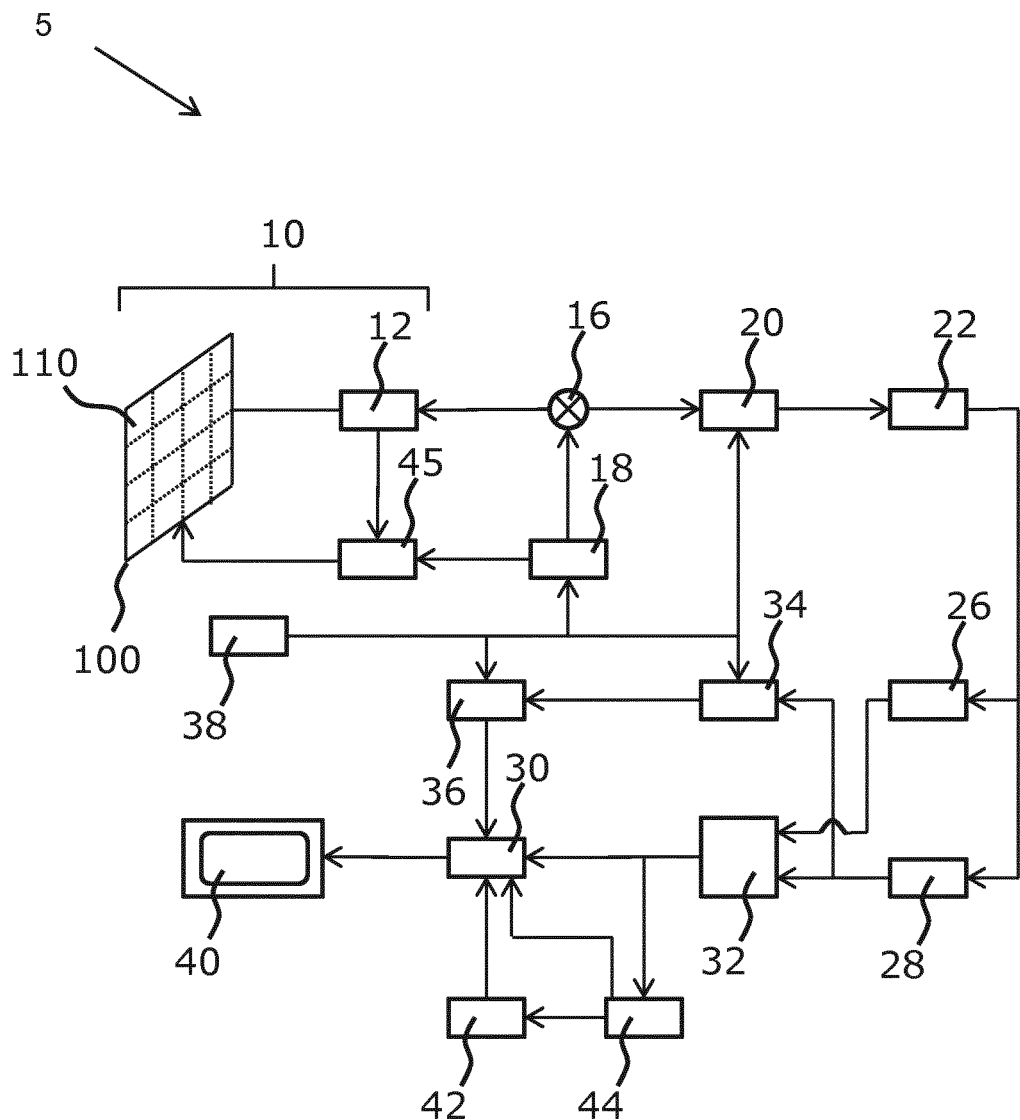
FIG. 1 shows an ultrasound diagnostic imaging system to explain the general operation.

The invention provides a method for generating a filtered ultrasound image. The method begins by obtaining channel data. First and second apodization functions are applied to the channel data to generate first and second image data, respectively. A minimization function is then applied to the first and second image data, which may then be used to generate third image data. The filtered ultrasound image may then be generated based on the first and third image data.

The general operation of an exemplary ultrasound diagnostic imaging system will first be described, with reference to FIG. 1, and with emphasis on the signal processing function of the system since this invention relates to the processing and filtering of the signals measured by the transducer array.

The system comprises an array transducer probe 10 which has a CMUT transducer array 100 for transmitting ultrasound waves and receiving echo information. The transducer array 100 may alternatively comprise piezoelectric transducers formed of materials such as PZT or PVDF. The transducer array 100 is a two-dimensional array of transducers 110 capable of scanning in a 2D plane or in three dimensions for 3D imaging. In another example, the transducer array may be a 1D array.

The transducer array 100 is coupled to a microbeamformer 12 in the probe which controls reception of signals by the CMUT array cells or piezoelectric elements. Microbeamformers are capable of at least partial beamforming of the signals received by sub-arrays (or "groups" or "patches") of transducers as described in U.S. Pat. No. 5,997,479 (Savord et al.), U.S. Pat. No. 6,013,032 (Savord), and U.S. Pat. No. 6,623,432 (Powers et al.).

Note that the microbeamformer is entirely optional. The examples below assume no analog beamforming.

The microbeamformer 12 is coupled by the probe cable to a transmit/receive (T/R) switch 16 which switches between transmission and reception and protects the main beamformer 20 from high energy transmit signals when a microbeamformer is not used and the transducer array is operated directly by the main system beamformer. The transmission of ultrasound beams from the transducer array 10 is directed by a transducer controller 18 coupled to the microbeamformer by the T/R switch 16 and a main transmission beamformer (not shown), which receives input from the user's operation of the user interface or control panel 38.

One of the functions controlled by the transducer controller 18 is the direction in which beams are steered and focused. Beams may be steered straight ahead from (orthogonal to) the transducer array, or at different angles for a wider field of view. The transducer controller 18 can be coupled to control a DC bias control 45 for the CMUT array. The DC bias control 45 sets DC bias voltage(s) that are applied to the CMUT cells.

In the reception channel, partially beamformed signals are produced by the microbeamformer 12 and are coupled to a main receive beamformer 20 where the partially beamformed signals from individual patches of transducers are combined into a fully beamformed signal. For example, the main beamformer 20 may have 128 channels, each of which receives a partially beamformed signal from a patch of dozens or hundreds of CMUT transducer cells or piezoelectric elements. In this way the signals received by thousands of transducers of a transducer array can contribute efficiently to a single beamformed signal.

The beamformed reception signals are coupled to a signal processor 22. The signal processor 22 can process the received echo signals in various ways, such as band-pass filtering, decimation, I and Q component separation, and harmonic signal separation which acts to separate linear and nonlinear signals so as to enable the identification of nonlinear (higher harmonics of the fundamental frequency) echo signals returned from tissue and micro-bubbles. The signal processor may also perform additional signal enhancement such as speckle reduction, signal compounding, and noise elimination. The band-pass filter in the signal processor can be a tracking filter, with its pass band sliding from a higher frequency band to a lower frequency band as echo signals are received from increasing depths, thereby rejecting the noise at higher frequencies from greater depths where these frequencies are devoid of anatomical information.

The beamformers for transmission and for reception are implemented in different hardware and can have different functions. Of course, the receiver beamformer is designed to take into account the characteristics of the transmission beamformer. In FIG. 1 only the receiver beamformers 12, 20 are shown, for simplicity. In the complete system, there will also be a transmission chain with a transmission micro beamformer, and a main transmission beamformer.

The function of the micro beamformer 12 is to provide an initial combination of signals in order to decrease the number of analog signal paths. This is typically performed in the analog domain.

The final beamforming is done in the main beamformer 20 and is typically after digitization.

The transmission and reception channels use the same transducer array 10' which has a fixed frequency band. However, the bandwidth that the transmission pulses occupy can vary depending on the transmission beamforming that has been used. The reception channel can capture the whole transducer bandwidth (which is the classic approach) or by using bandpass processing it can extract only the bandwidth that contains the useful information (e.g. the harmonics of the main harmonic).

The processed signals are coupled to a B mode (i.e. brightness mode, or 2D imaging mode) processor 26 and a Doppler processor 28. The B mode processor 26 employs detection of an amplitude of the received ultrasound signal for the imaging of structures in the body such as the tissue of organs and vessels in the body. B mode images of structure of the body may be formed in either the harmonic image mode or the fundamental image mode or a combination of both as described in U.S. Pat. No. 6,283,919 (Roundhill et al.) and U.S. Pat. No. 6,458,083 (Jago et al.) The Doppler processor 28 processes temporally distinct signals from tissue movement and blood flow for the detection of the motion of substances such as the flow of blood cells in the image field. The Doppler processor 28 typically includes a wall filter with parameters which may be set to pass and/or reject echoes returned from selected types of materials in the body.

The structural and motion signals produced by the B mode and Doppler processors are coupled to a scan converter 32 and a multi-planar reformatter 44. The scan converter 32 arranges the echo signals in the spatial relationship from which they were received in a desired image format. For instance, the scan converter may arrange the echo signal into a two dimensional (2D) sector-shaped format, or a pyramidal three dimensional (3D) image. The scan converter can overlay a B mode structural image with colors corresponding to motion at points in the image field with their Doppler-estimated velocities to produce a color Doppler image which depicts the motion of tissue and blood flow in the image field. The multi-planar reformatter will convert echoes which are received from points in a common plane in a volumetric region of the body into an ultrasound image of that plane, as described in U.S. Pat. No. 6,443,896 (Detmer). A volume renderer 42 converts the echo signals of a 3D data set into a projected 3D image as viewed from a given reference point as described in U.S. Pat. No. 6,530,885 (Entrekin et al.).

The 2D or 3D images are coupled from the scan converter 32, multi-planar reformatter 44, and volume renderer 42 to an image processor 30 for further enhancement, buffering and temporary storage for display on an image display 40. In addition to being used for imaging, the blood flow values produced by the Doppler processor 28 and tissue structure information produced by the B mode processor 26 are coupled to a quantification processor 34. The quantification processor produces measures of different flow conditions such as the volume rate of blood flow as well as structural measurements such as the sizes of organs and gestational age. The quantification processor may receive input from the user control panel 38, such as the point in the anatomy of an image where a measurement is to be made. Output data from the quantification processor is coupled to a graphics processor 36 for the reproduction of measurement graphics and values with the image on the display 40, and for audio output from the display device 40. The graphics processor 36 can also generate graphic overlays for display with the ultrasound images. These graphic overlays can contain standard identifying information such as patient name, date and time of the image, imaging parameters, and the like. For these purposes the graphics processor receives input from the user interface 38, such as patient name. The user interface is also coupled to the transmit controller 18 to control the generation of ultrasound signals from the transducer array 10' and hence the images produced by the transducer array and the ultrasound system. The transmit control function of the controller 18 is only one of the functions performed. The controller 18 also takes account of the mode of operation (given by the user) and the corresponding required transmitter configuration and band-pass configuration in the receiver analog to digital converter. The controller 18 can be a state machine with fixed states.

The user interface is also coupled to the multi-planar reformatter 44 for selection and control of the planes of multiple multi-planar reformatted (MPR) images which may be used to perform quantified measures in the image field of the MPR images.

Figure 2:
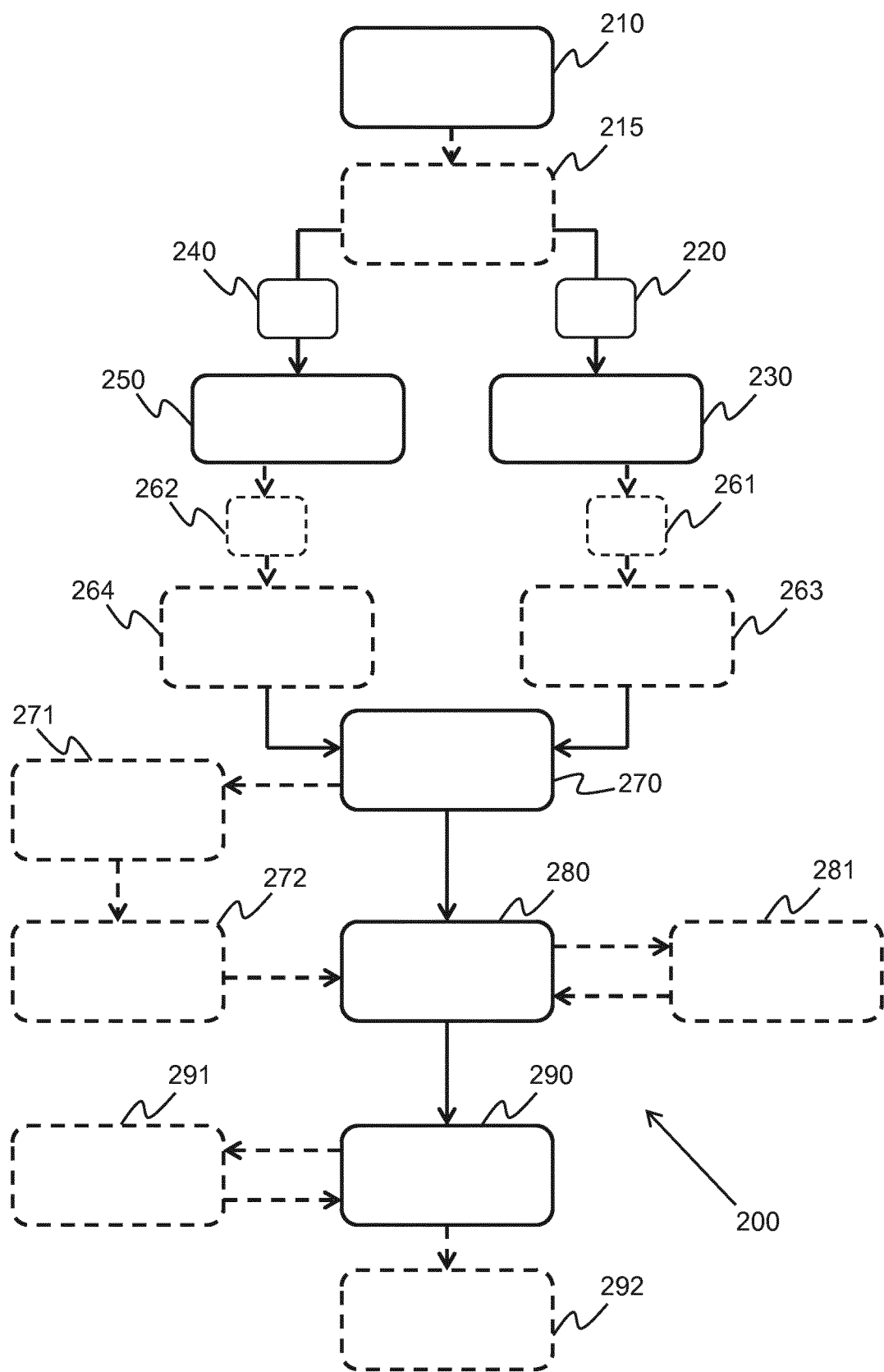
FIG. 2 shows a method of the invention.

FIG. 2 shows a method 200 of the invention that may for example be implemented by signal processor 22, shown in FIG. 1, or by a separate dedicated controller.

In step 210, channel data is obtained. For example, the channel data may comprise ultrasound signals captured by the array transducer probe 10. Channel data may comprise frequency domain signals, which may be obtained by applying a Fourier transform to the time domain signals captured by the array transducer probe. In step 215, the channel data may be delayed to improve the focus of the signals. Individual delays are applied to each channel of the transducer array.

A first apodization function 220 is then applied to the channel data in order to generate first image data 230. In addition, a second apodization function 240 is also applied to the channel data to generate second image data 250.

In step 261, the first image data may summed in order to form the full first image signal and, similarly, in step 262, the second image data may also be summed. Steps 215 and 261 and 262 form the process of delay and sum (DAS) beamforming. DAS beamforming introduces delays to each transducer of the array transducer probe 10 before summing them together to form the final signal. This may help to increase the signal to noise ratio of the first and second image data, thereby generating more accurate data to be used in subsequent steps.

Envelope detection may then be applied to the first and second image data in steps 263 and 264 respectively. Envelope detection may be used to transform the ultrasonic data within the first and second image data sets into readily usable digital image data.

In step 270, a minimization function is applied to the first and second image data. In step 271, the first and second image data may be compared and in step 272, for each pair of pixels, the pixel with the lowest pixel value is selected.

For example, the minimization function may compare a pixel of the first image data to the corresponding pixel of the second image data. The pixel of the first image data will contain a first signal and the corresponding pixel of the second image data will contain a second signal. If the first signal is lower than the second signal, the first signal will be selected. Alternatively, if the second signal is lower than the first signal, the second signal is selected. In some cases, the signals may cross; meaning that at certain points in frequency space for the pixel the first signal may be lower than the second; whereas, at other points in frequency space for the same pixel, the second signal may be lower than the first signal. In this situation, a combination of the first and second signals may be selected to produce an overall minimal signal. In this way, the pixel with the minimum pixel value is selected.

In step 280, third image data is generated from the minimized first and second image data. In step 281, the third image data may be constructed from the pixels selected in step 272, resulting in the third image data having the minimum pixel values of the first and second image data. By storing the minimized first and second image data as a third set of image data, it may be used independently of the first and second data sets without disrupting the original data.

In step 290, the filtered ultrasound image is generated based on the third and first image data. In step 291, the third image data may be subtracted from the first image data, thereby subtracting the minimized pixel values of the first and second image data from the original first image data. In this way, the ultrasound image may undergo clutter filtering. If the third image data highlights the clutter in the first image data, by way of a specific combination of first and second apodization functions and respective image data, the subtraction of the third image data from the first image data results in the total elimination of the sidelobe clutter from the first image data.

In step 292, the filtered ultrasound image may undergo log compression. The variation in the amplitude of radio frequency data collected by an ultrasound system is very high. Typically, the image data is mapped to a 0-255 gray scale image; however, many of the important tissue structures have image values of 0-9. This may result in high amplitude points overshadowing the rest of the image. By performing log compression on the image, it is possible to generate a more balanced image.

Figure 3:
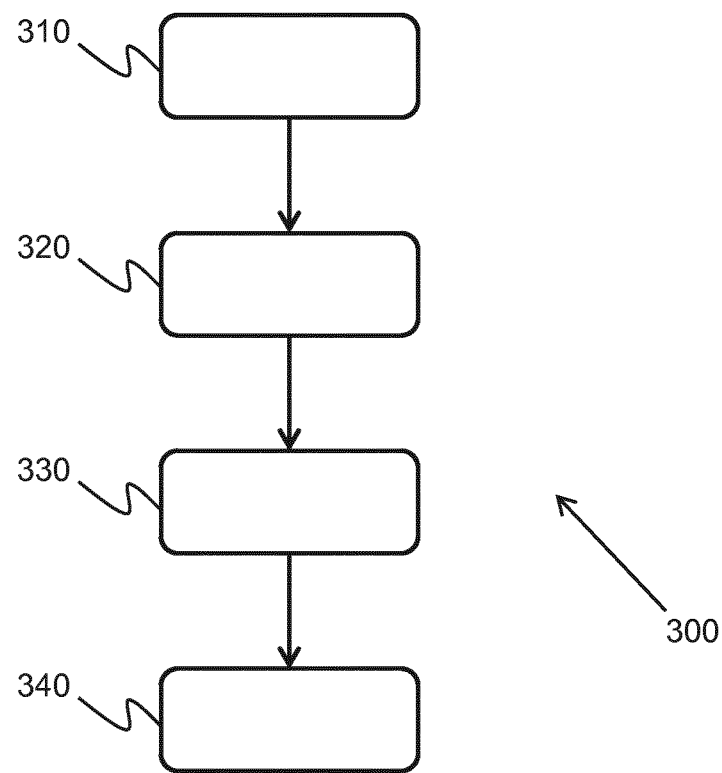
FIG. 3 shows a further filtering method which may be used within the method of FIG. 2.

FIG. 3 shows a further method 300, which may occur after the log compression of the filtered ultrasound image. The minimization involved in the filtering method described in FIG. 2 often introduces a blocky, low resolution appearance to the high contrast image, which may be overcome by the following process.

In step 310, a spatial low pass filter is applied to the first image data, which may be written as: $LPF(I_1)$ where $I_1$ is the first image data; and in step 320, a spatial low pass filter is applied to the filtered ultrasound image, which may be written as: $LPF(I_1-min(I_1, I_2))$ where $I_2$ is the second image data. These two steps are the initial stages in decomposing the high resolution, low contrast first image data and the low resolution, high contrast filtered ultrasound image into their constituent parts.

In step 330, a detail component is generated by subtracting the spatial low pass filtered first image data, obtained in step 310, from the original first image data. This may be written as: $D_1=I_1-LPF(I_1)$. $D_1$ is the detail component and contains the high resolution, low contrast information from the first image data.

In step 340, the detail component may be combined with the spatial low pass filtered ultrasound image, obtained in step 320, which contains the low resolution, high contrast information. This is given by the following equation: $I_{final}=LPF(I_1-min(I_1, I_2))+D_1$ where $I_{final}$ is the final high resolution, high contrast image. In this way, it is possible to benefit from the enhanced contrast in the sidelobe-free image, whilst preserving the smoothness and detail from the original first image data.

Figure 4:
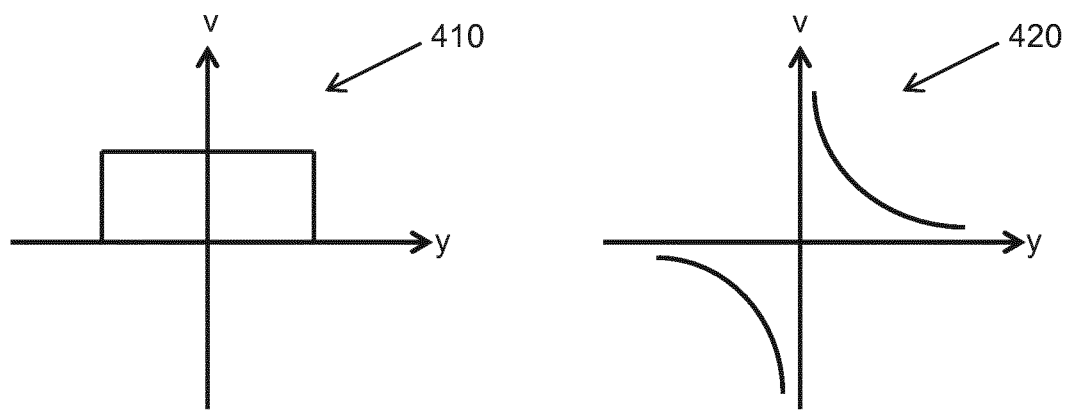
FIG. 4 shows two apodization functions according to embodiments of the invention.

FIG. 4 shows two examples of apodization functions which may be applied to the channel data. The graphs are plotted as voltage weighting, v, against distance from the center of the ultrasonic transducer array, y. The first graph 410 shows an example of a first apodization function in the form of a rectangular apodization function. In this case, all of the elements of the transducer array receive an equal weighting. The results of applying this function to the channel data are discussed in FIG. 5.

The second graph 420 shows an example of a second apodization function in the form of a reciprocal function, such as y=1/x, which may be used to introduce a null point in the image data. In this way, the central elements of the transducer array receive a high weighting, which decreases exponentially towards elements at the edges of the array. The results of applying this function to the channel data are discussed with reference to FIG. 6. The shapes of the apodization functions may be designed by the user of the ultrasound system or may be preloaded onto the system and selected by the user to perform a desired function. Once the shape of the apodization function has been selected, or designed, by the user, it may be adjusted through a single parameter. This parameter is the scaling factor, k, which may be empirically determined by the user through the use of the ultrasound system.

Figure 6:
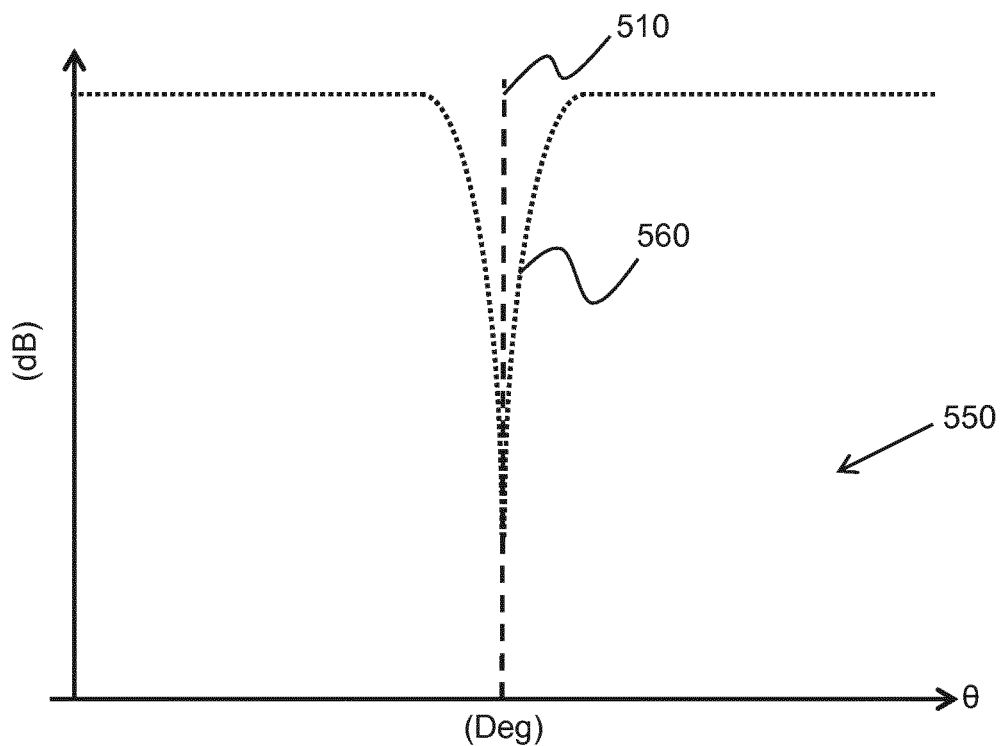
FIG. 6 shows a graph of signal magnitude against arrival angle for the second image data.

Linear acoustics dictates that the ultrasound beampattern is equivalent to the Fourier transform of the apodization function used. This relationship gives a tool for analysis and beampattern design. More specifically, it is possible to design the apodization function to achieve a desired beampattern. For example, the second image data may have a sharp null at the mainlobe location and high amplitude at all other arrival angles, as shown in FIG. 6. The Fourier transform relationship between the second apodization function and the beampattern of the second image data can be used to discern what type of apodization function should be used to achieve the desired beampattern.

Figure 5:
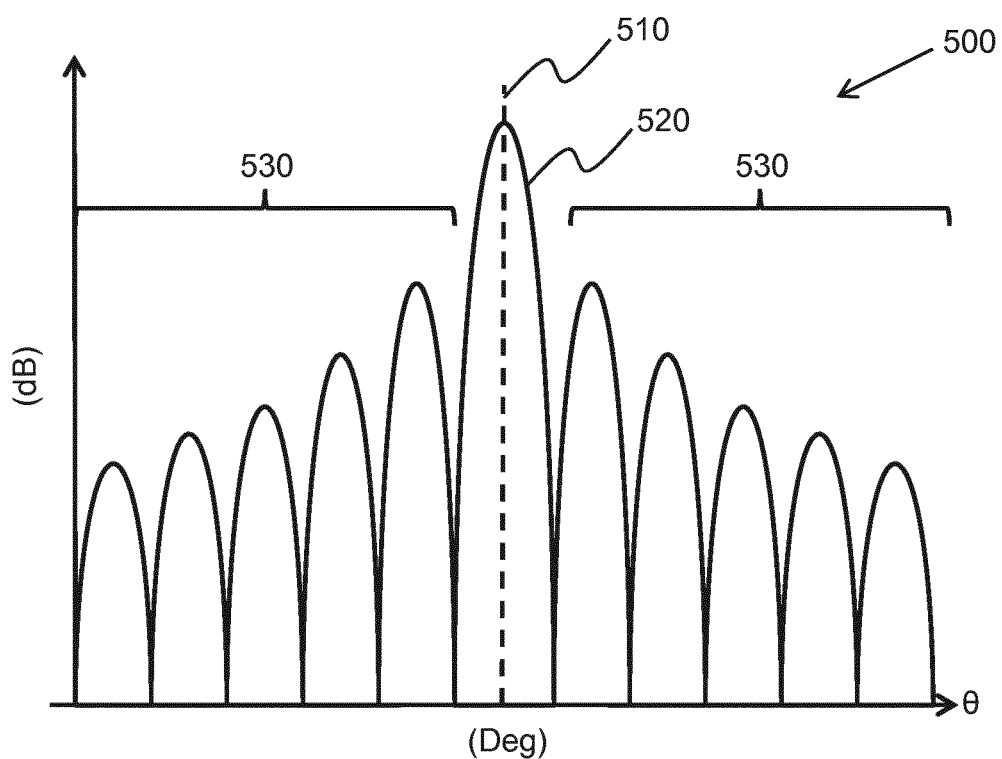
FIG. 5 shows a graph of signal magnitude against arrival angle for the first image data.

FIG. 5 shows a graph 500 of magnitude, measured in dB, against arrival angle, θ. The graph depicts the summation of all of the channel signals received by each transducer element of a transducer array, across all of the angles within the field of view of said array. More specifically, the graph shows the first image data obtained from the channel data by way of the first apodization function shown in FIG. 4.

This data translates to a standard B-mode ultrasound image data, which has a single high intensity signal at an arrival angle of 0 degrees 510, referred to as a mainlobe 520. Channel signals with an arrival angle of 0 degrees arrive coherently at the transducer array and form the mainlobe of the first image data. Due to spatial resolution limitations, the mainlobe has a finite width that includes a small range of angles either side of 0 degrees. The first image data also includes multiple signals of diminishing intensity spreading out from the mainlobe, referred to as sidelobes 530. The sidelobes are formed from channel signals with an arrival angle outside of the range of the mainlobe. Constructive and destructive interference effects at different angles create the peaks and troughs in the sidelobes. The sidelobes form the clutter in an ultrasound image; whereas, the mainlobe forms the response signal of the ultrasound image target.

FIG. 6 shows a similar graph to FIG. 5; however, in this case, the graph shows the second image data for the same pixel, obtained from the channel data by way of the second apodization function shown in FIG. 4.

By applying the reciprocal second apodization function to the channel data, a null 560 has been generated at the same lateral location as the mainlobe of the first image data 510. In this example, the second apodization function is acting as a notch filter; however, depending on the application, many different shapes of apodization function may be utilized.

Figure 7:
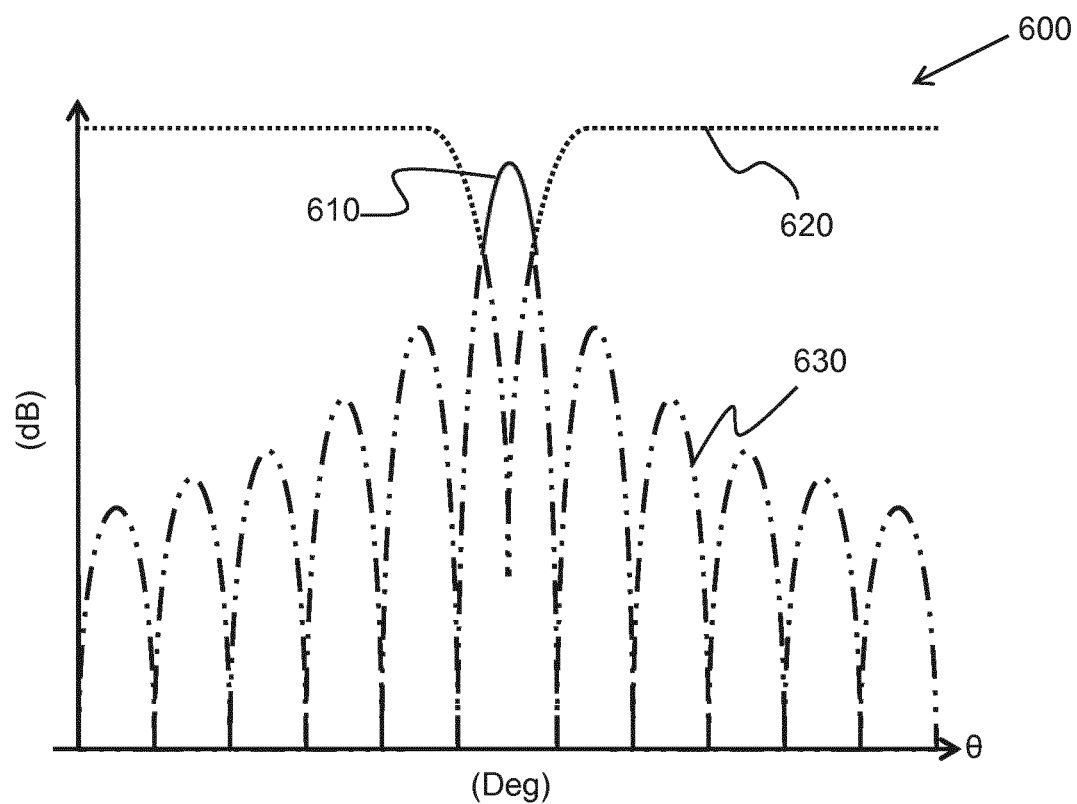
FIG. 7 shows a graph of signal magnitude against arrival angle for a minimization function applied to the combined first and second image data.

FIG. 7 shows a graph 600 depicting a superposition of the graphs from FIGS. 5 and 6, which depict the first 610 and second 620 image data, respectively, for a pixel. By comparing the first and second image data, the minimum signal magnitude across the arrival angle can be found. This is highlighted by dashed line 630.

As can be seen from the graph, the minimum values 630 highlight the sidelobes of the first image data and the null point of the second image data. In this way, the clutter signals are selected and isolated from the peak of the mainlobe of the signal. This may be used over a standard low pass filter in order to effectively remove clutter from low intensity signals without the risk of the mainlobe falling below the threshold of the filter. The minimum values form the third image data.

Figure 8:
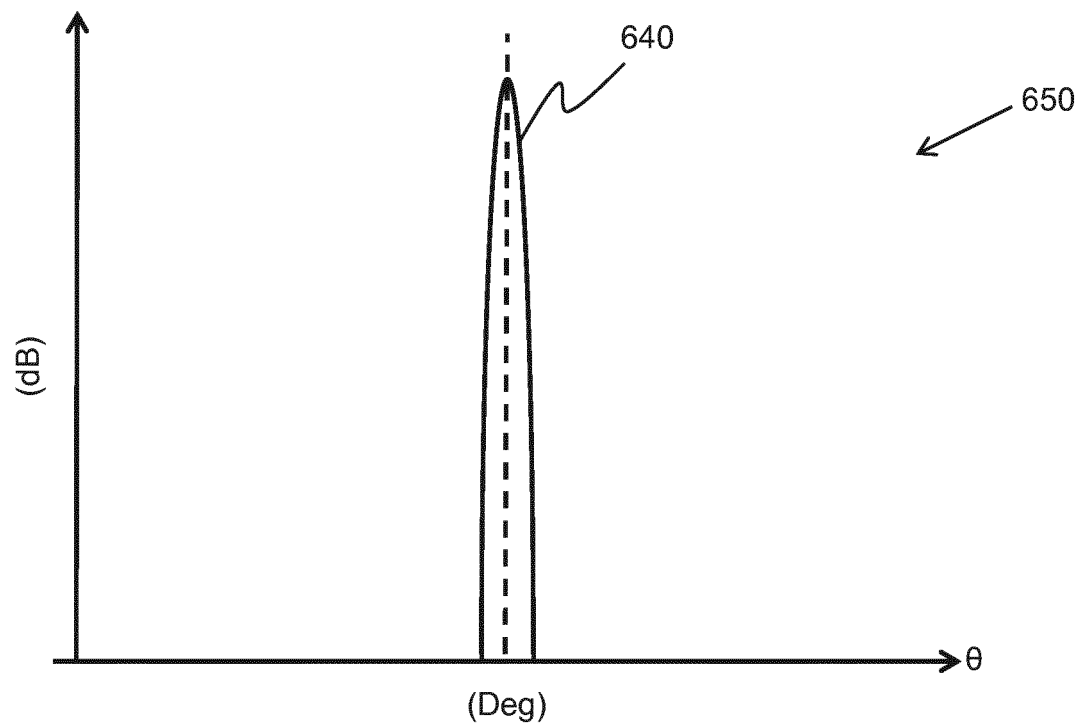
FIG. 8 shows a graph of signal magnitude against arrival angle for the filtered ultrasound image.

The minimum values 630, corresponding to the third image data, may then be subtracted from the original first image data shown in FIG. 5. The result of this is shown in FIG. 8, which depicts the resulting signal 640 on a similar graph 650 to FIGS. 5 to 7.

The graph 650 shows that the sidelobes 530 of the first image data have been eliminated, meaning that the resulting signal 640 is solely made up from the mainlobe of the first image data. In this way, sidelobe clutter is eliminated from the ultrasound image.

The shape of the second apodization function, shown in graph 420 of FIG. 4, may be altered to change the width of the null function 560 in the second image data. In this way, the width of the resulting signal 640 may be controlled. By reducing the width of this resulting function, the spatial resolution of the final ultrasound image may be increased.

As discussed above, embodiments make use of a controller for performing the data processing steps.

The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for generating a filtered ultrasound image, the method comprising:
   obtaining channel data from an ultrasonic transducer array;
   generating first image data from the channel data using a first apodization function;
   generating second image data from the channel data using a second apodization function, wherein the second apodization function comprises a null filter exhibiting a null at a lobe location;
   applying a minimizing function to the first and second image data;
   generating third image data based on the minimized first and second image data; and
   generating the filtered ultrasound image based on the first and third image data, wherein the generation of the filtered ultrasound image comprises:
      subtracting the pixel values of the third image data from the pixel values of the first image data, thereby generating filtered pixels; and
      constructing the filtered ultrasound image using the filtered pixels.

2. The method as claimed in claim 1, wherein the minimization function comprises: comparing the first and second image data; and
   for each pair of pixels from the first and second image data, selecting a pixel with the minimum pixel value based on the comparison.

3. The method as claimed in claim 2, wherein the generation of the third image data comprises:
   constructing the third image data using the selected pixels.

4. The method as claimed in claim 1, wherein the method further comprises performing a log compression on the filtered ultrasound image.

5. The method as claimed in claim 1, wherein the first apodization function comprises a rectangular function.

6. The method as claimed in claim 1, wherein a scaling factor of the second apodization function is variable.

7. The method as claimed in claim 1, wherein the method further comprises applying DAS beamforming to the first and second image data, the DAS beamforming comprising:
   before the steps of generating the first and second image data, delaying the channel data;
   after the steps of generating the first and second image data, summing the first image data and summing the second image data, respectively.

8. The method as claimed in claim 1, wherein the method further comprises applying envelope detection to the first and second image data.

9. A computer program comprising computer program code means which is adapted, when said computer is run on a computer, to implement the method of claim 1.

10. A method for generating a filtered ultrasound image, the method comprising:
    obtaining channel data from an ultrasonic transducer array;
    generating first image data from the channel data using a first apodization function;
    generating second image data from the channel data using a second apodization function, wherein the second apodization function comprises a null filter;
    applying a minimizing function to the first and second image data;
    generating third image data based on the minimized first and second image data; and
    generating the filtered ultrasound image based on the first and third image data, wherein the generation of the filtered ultrasound image comprises:
       subtracting the pixel values of the third image data from the pixel values of the first image data, thereby generating filtered pixels; and
    constructing the filtered ultrasound image using the filtered pixels, wherein the method further comprises performing a log compression on the filtered ultrasound image; and
    wherein the method, after the step of performing a log compression on the filtered ultrasound image, further comprises:
    applying a spatial low pass filter to the first image data;
    applying a spatial low pass filter to the filtered ultrasound image;
    generating a detail component of the first image data by subtracting the spatial low pass filtered first image data from the first image data; and
    combining the detail component of the first image data with the spatial low pass filtered version of the filtered ultrasound image.

11. A controller for generating a filtered ultrasound image in an ultrasound system, wherein the controller is coupled to an ultrasonic transducer array and adapted to:
- obtain channel data from the ultrasonic transducer array;
- generate first image data from the channel data using a first apodization function;
- generate second image data from the channel data using a second apodization function, wherein the second apodization function comprises a null filter exhibiting a null at a lobe location;
- apply a minimizing function to the first and second image data;
- generate third image data based on the minimized first and second image data; and
- generate the filtered ultrasound image based on the first and third image data, wherein during the generation of the filtered ultrasound image the controller is further adapted to:
  - subtract the pixel values of the third image data from the pixel values of the first image data, thereby generating filtered pixels; and
  - construct the filtered ultrasound image using the filtered pixels.

12. An ultrasound system comprising:
- an ultrasonic transducer array, wherein the ultrasonic transducer array is capable of emitting and receiving ultrasonic signals, based on which channel data are obtained;
- a signal processor for compiling the received ultrasonic signals into an ultrasound image;
- a controller as claimed in claim 11; and
- an image output device for outputting the filtered ultrasound image.

13. The ultrasound system as claimed in claim 12, wherein the ultrasound system further comprises:
- a filter design processor, wherein the filter design processor is adapted to alter the second apodization function.

* * * * *